US012459786B2

(12) United States Patent
Sekulich et al.

(10) Patent No.: US 12,459,786 B2
(45) Date of Patent: Nov. 4, 2025

(54) LIFTING SYSTEM WITH ACTUATED LIFT PINS AND LIFT COLLAR

(71) Applicant: Caterpillar Inc., Peoria, IL (US)

(72) Inventors: Michael S. Sekulich, Raleigh, NC (US); Jeffrey M. Pillis, Apex, NC (US); Diana K. Jarosiewicz, Cary, NC (US); Trevor C. Nienke, Willow Spring, NC (US); Henry L. Furr, Willow Spring, NC (US); Mark A. Rominger, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 913 days.

(21) Appl. No.: 17/552,966

(22) Filed: Dec. 16, 2021

(65) Prior Publication Data

US 2023/0192448 A1 Jun. 22, 2023

(51) Int. Cl.
*B66C 1/10* (2006.01)
*B66C 1/22* (2006.01)
*B66C 1/66* (2006.01)
*B66C 13/14* (2006.01)

(52) U.S. Cl.
CPC .................. *B66C 1/10* (2013.01); *B66C 1/22* (2013.01); *B66C 1/66* (2013.01); *B66C 13/14* (2013.01)

(58) Field of Classification Search
CPC .... B66C 1/10; B66C 1/66; B66C 1/22; B66C 1/54; B66C 1/56; B66C 13/14
USPC ....................................... 294/93, 94, 96, 195
See application file for complete search history.

(56) References Cited

U.S. PATENT DOCUMENTS

| | | | | |
|---|---|---|---|---|
| 3,206,243 A * | 9/1965 | Miles | B66C 1/66 | 294/93 |
| 3,666,216 A * | 5/1972 | Nagy | B63G 8/42 | 244/172.4 |
| 4,121,868 A * | 10/1978 | Pierce | B66C 1/66 | 976/DIG. 251 |
| 4,573,725 A | 3/1986 | Griffiths | | |
| 4,863,205 A | 9/1989 | Schron et al. | | |

(Continued)

FOREIGN PATENT DOCUMENTS

| | | |
|---|---|---|
| CN | 102923562 B | 11/2014 |
| CN | 110077956 A1 | 8/2019 |

(Continued)

OTHER PUBLICATIONS

European Extended Search Report for Europe Patent Appln. No. 22208960.9, mailed May 10, 2023 (7 pgs).

*Primary Examiner* — Paul T Chin

(57) ABSTRACT

A lift coupling system includes a lifting base attachable to an object. The lifting base includes a housing. Lift pins move between a retracted state within the housing and an extended state wherein a portion of each of the lift pins extend outwardly from the housing. An actuator moves the lift pins between the retracted and extended state. A lift collar includes a lift collar body configured to fit about the housing. The lift collar contacts and couples the lift pins to the lift collar when positioned about the housing and the lift pins are in the extended state and decouple therefrom when the lift pins are in the retracted state. At least one lift tab may be arranged on the lift collar body configured to enable lifting of the lifting base and the object thereby when the lift collar is coupled to the lifting base.

20 Claims, 17 Drawing Sheets

(56) References Cited

U.S. PATENT DOCUMENTS

| | | | | |
|---|---|---|---|---|
| 5,476,300 | A * | 12/1995 | Dodge | B66C 1/54 294/93 |
| 7,469,618 | B2 | 12/2008 | Bandi | |
| 8,591,161 | B1 | 11/2013 | Bernhardt | |
| 11,827,386 | B2 * | 11/2023 | Michel | B64G 1/6462 |
| 2004/0032140 | A1 | 2/2004 | Solstad | |
| 2008/0085177 | A1 * | 4/2008 | Waisanen | B66C 1/422 414/618 |
| 2017/0240388 | A1 | 8/2017 | Heinzmann et al. | |
| 2019/0202670 | A1 * | 7/2019 | Jackson | B66C 1/66 |
| 2021/0238825 | A1 * | 8/2021 | Stuart | E02F 9/0808 |

FOREIGN PATENT DOCUMENTS

| | | |
|---|---|---|
| EP | 0725935 B1 | 1/2005 |
| GB | 2408251 | 5/2005 |

* cited by examiner

LIFTING SYSTEM WITH ACTUATED LIFT PINS AND LIFT COLLAR

TECHNICAL FIELD

The present disclosure relates to devices for and methods of lifting heavy equipment into position at a work site.

BACKGROUND

To accomplish work tasks, work machines often need to be lifted into a work site. For example, small wheel loaders are machines that are used to unload the contents of large barges. To be positioned within a barge, the machines are lifted by a large crane or hoist often connected to multiple points on the machine frame, or the machines are placed on a platform that is connected to a crane or a hoist.

Small wheel loaders generally include a machine frame, four wheels, and a cab mounted on the machine frame. The work machine includes a tool to scoop, or move/push, material from the ground, such as dirt, sand, or gravel, for transporting to a discharge location. The tool is typically connected to two booms that are connected to the machine frame, and the cab is adapted to protect the operator from the environment and often includes a door and front and side windows for entry and exit from the machine and for a sufficiently wide field of view to operate the machine. Such machines are typically a challenge to move quickly and safely.

Moving machines creates the need for lifting systems and methods for moving such machines from one location to another while reducing exposure of personnel to safety risks, which can occur while connecting or disconnecting the crane to the machine. In addition, there is a need to be able to determine whether connection mechanisms for attaching a machine to a crane or hoist are correctly positioned and securely fastened, to reduce the risk of injury to personnel and damage to the machine or crane.

U.S. Pat. No. 4,573,725 discusses a remote operable coupler for rapidly connecting a loading hook of a crane to a load to be hoisted. The coupler comprises a load collar that is attached to the load and an upper unit support on the crane hook. The load collar has a funnel shaped aperture vertically aligned therethrough and the upper unit has a lifting tube that is lowered into and through the funnel in the collar. Steel balls are located in radial holes near the bottom of the lifting tube and normally are recessed into an annular groove near the bottom end of a cam rod in the bore of the lifting tube. The cam rod is automatically moved by an actuator controlled by a switch that detects the seating of the lifting tube in the load collar to force the balls outward and against a locking shoulder in the bottom of the load collar funnel, and disengagement of the balls is made by a remote operator by either a radio control signal or an electrical signal that reverses the movement of the linear actuator and the cam shaft thus permitting the balls to fall back into the annular groove.

There is a demand for reliable systems and methods for attaching a machine or object to be moved to a crane or hoist or the like. The present disclosure addresses the demand.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, the disclosure includes lift coupling system for enabling an object to be lifted, comprising a lifting base configured to be attached to the object, the lifting base comprising a housing. A plurality of lift pins are configured to move between a retracted state within the housing of the lifting base and an extended state wherein a portion of each of the plurality of lift pins are extended outwardly from the housing. An actuator is configured to move the plurality of lift pins between the retracted state and the extended state. A lift collar comprises a lift collar body shaped and sized to fit about the housing of the lifting base. The lift collar is configured to contact the plurality of lift pins when the lift collar is positioned about the housing and when the plurality of lift pins are extended outwardly to the extended state to couple the lift collar to the lifting base and configured to decouple from the lifting base when the plurality of lift pins are retracted into the housing to the retracted state. At least one lift tab may be arranged on the lift collar body configured to enable lifting of the lifting base and the object thereby when the lift collar is coupled to the lifting base.

In another aspect, the disclosure includes a system for enabling an object to be lifted, comprising an object and a single point lifting structure attached to the object and a lift coupling system for enabling an object to be lifted, comprising a lifting base configured to be attached to the object, the lifting base comprising a housing. A plurality of lift pins are configured to move between a retracted state within the housing of the lifting base and an extended state wherein a portion of each of the plurality of lift pins are extended outwardly from the housing. An actuator is configured to move the plurality of lift pins between the retracted state and the extended state. A lift collar comprises a lift collar body shaped and sized to fit about the housing of the lifting base. The lift collar is configured to contact the plurality of lift pins when the lift collar is positioned about the housing and when the plurality of lift pins are extended outwardly to the extended state to couple the lift collar to the lifting base and configured to decouple from the lifting base when the plurality of lift pins are retracted into the housing to the retracted state. At least one lift tab may be arranged on the lift collar body configured to enable lifting of the lifting base and the object thereby when the lift collar is coupled to the lifting base.

In yet another aspect, the disclosure incudes a method of operating a lift coupling system, comprising lowering a lift collar onto a lifting base, the lifting base attached to an object; positioning the lift collar below a plurality of lift pins of the lifting base; moving the plurality of lift pins from a retracted state to an extended state in which the plurality of lift pins are extended from the lifting base; and engaging the lift collar with the plurality of lift pins to lift the object.

DETAILED DESCRIPTION

Figure 1:
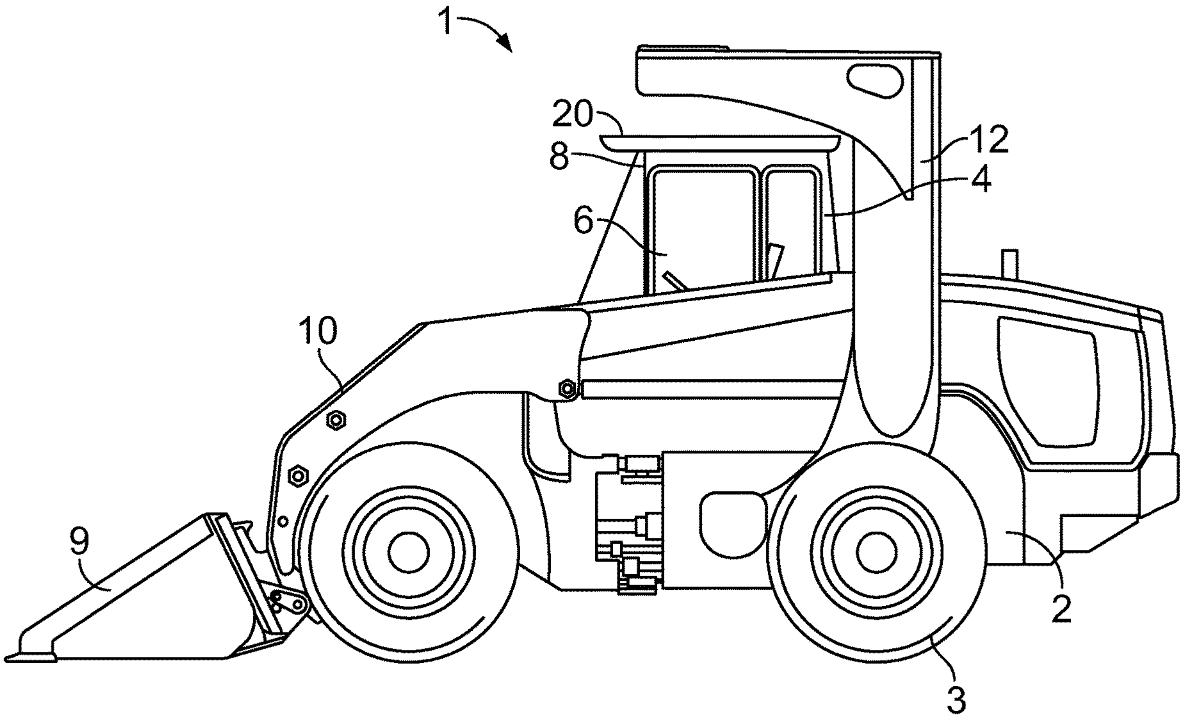
FIG. 1 is an exemplary object, embodied as a work machine, that can be lifted, lowered, and moved using the lift coupling system according to embodiments.

Now referring to the drawings, wherein like elements refer to like reference numbers, there is illustrated in FIG. 1 an exemplary embodiment of a object to be lifted generally referred to by reference numeral 1. Although the object 1 is illustrated as a small wheel loader, the object 1 is shown primarily for illustrative purposes to assist in providing context for various embodiments of the lift coupling system of the disclosure. It will be understood that devices and methods according to embodiments of this disclosure can be employed on any machine, device, material, or structure, for example, which is moved by some type of hoist or the like.

Referring to the figure, the work machine 1 includes a machine frame 2 supported by wheels 3. Although wheels 3 are shown, other support and movement devices may be arranged on the machine 1, such as tracks. A cab 4 may be mounted on the frame 2 configured to accommodate an operator of the work machine 1. The cab 4 may include a door 6 to allow the operator to enter and exit the cab 4, and a window or openings 8 to permit the operator to view a work site in which the work machine 1 is operated. The cab 4 typically includes a roof 20 to enclose the top of the cab.

The work machine 1 may further include a tool 9 connected to the machine frame 2 by one or more booms 10. As an example, the tool 9 may be a bucket or blade configured to move or load materials such as asphalt, demolition debris, snow, feed, gravel, logs, and raw minerals, recycled rock, or sand. Also shown is a single point lift structure 12 which may be formed as a structure separate from the cab 4 or in other embodiments may be formed by the cab 4 itself.

The lift structure 12 is attached to the frame 2 of the work machine 1. The lift structure 12 may be attached to both sides of the frame below the operator cabin 4 and is shaped to extend in such a manner so as to avoid blocking the window 8 and the door 6 of the cab 4. This allows an operator to enter and exit the cab 4 via the door 6 and see through the window 8. Further, by being attached to the frame 2 of the work machine 1, the lift structure 12 is able to fully support the weight of the work machine 1 when the work machine 1 is lifted. It will be understood that the material and configuration of the lift structure 12 will enable safe lifting of the machine 1. It will also be understood that the lift structure 12 may be any shape and size to permit attachment thereto of a lift coupling system 22, which will be described hereinbelow, and permit a hoist or the like to safely lift, move, and lower the machine 1 into any suitable work site. The lift structure 12 is also configured to take into account the weight distribution of the machine 1.

Figure 2:
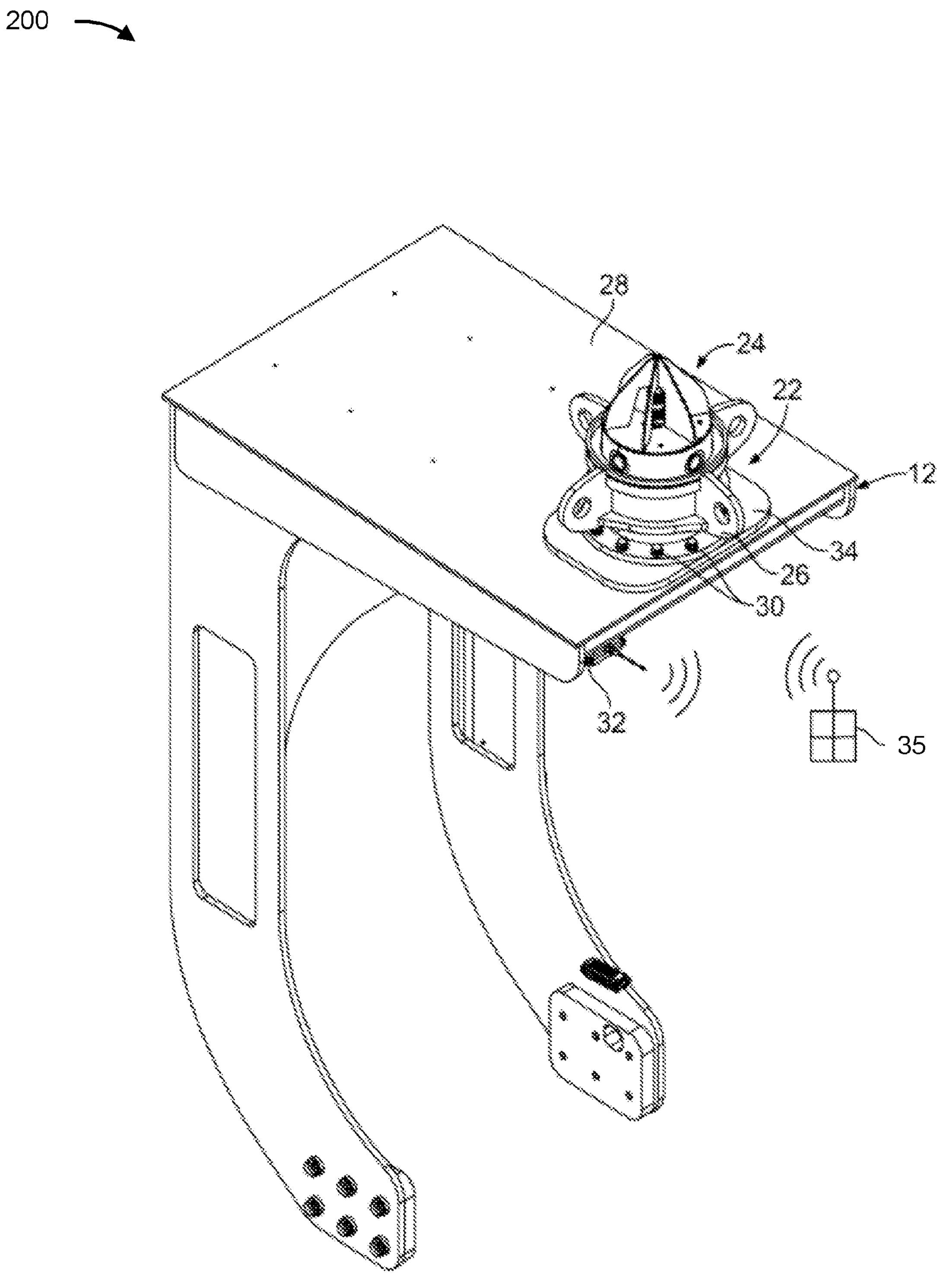
FIG. 2 is a perspective top view of a lift coupling system according to embodiments of the invention positioned on a lifting structure of a machine.

FIG. 2 shows a lift coupling system 22 mounted to a lift structure 12. The lift coupling system 22 includes two main parts, a lifting base/mounting/locking assembly 24, which may also be referred to herein as a lifting base, which is attached to the lift structure 12, and a lift collar 26, which is removably attachable to the lifting base. While the lifting base/mounting/locking assembly 24 may be permanently attached to the machine 1, it may be removably attached thereto.

In embodiments, the lifting base/mounting/locking assembly 24 is attached to span 28 of the lift structure 12. The lifting base/mounting/locking assembly 24 may be attached to the lift structure 12 by fasteners 30, such as bolts and nuts, or any suitable fastening mechanism or method. The lifting structure 12 is shown with an optional structural plate 34 positioned and fastened between the lifting structure and the lifting base/mounting/locking assembly 24 to reinforce the connection therebetween and distribute the load when the machine 1 is lifted. Also shown is a communication module 32, which may be located somewhere on the lift structure 12 as shown or any suitable location on or near the machine such that the communication module may send signals and/or power to the lifting base/mounting/locking assembly 24. The communication module 32 includes a receiver or a transceiver and is configured also to send signals and/or electrical power to elements of the lifting base. The communication module 32 is also in communication with a remote control 56, which an operator may use to send commands or control signals via manual inputs to transition the lift coupling system 22 between engagement and disengagement to permit lifting of the machine 1 and subsequent operation.

Figure 3:
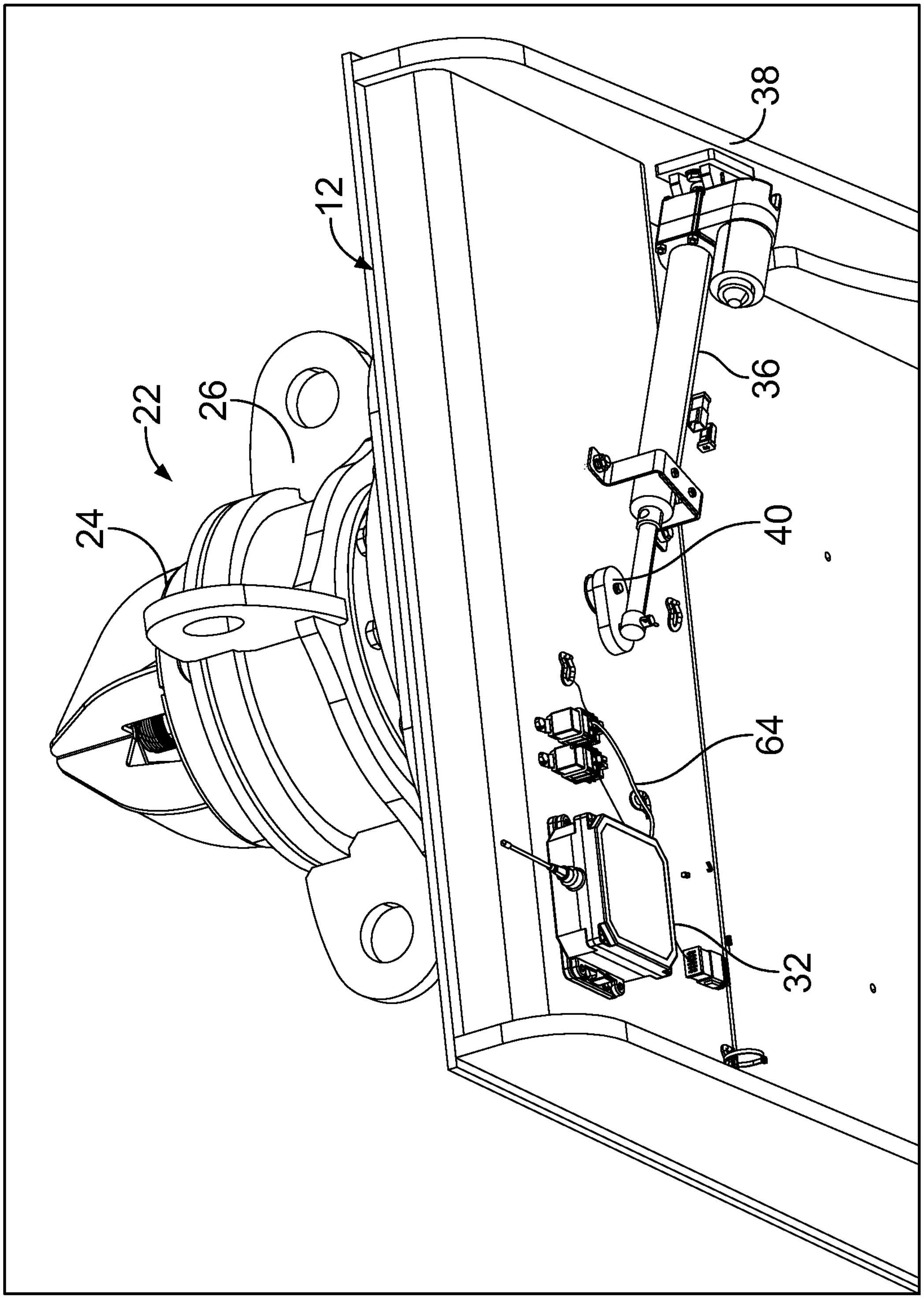
FIG. 3 is a perspective bottom view of a lift coupling system according to the disclosure positioned on a lifting structure of a machine.

FIG. 3 shows the underneath, interior view of the lifting structure 12. The communication module 32 may be positioned underneath the central span 28, as shown, so as to permit effective wireless connectivity to a remote operator (not shown) in embodiments. The communication module 32 may be positioned in any suitable location on the machine or on the lifting structure 12, for example. An actuator 36 is positioned underneath the central span 28 (FIG. 2). The underneath positioning of the actuator 36 and communication module 32 protects those components and provides a convenient, accessible attachment position. In one embodiment, a first end the actuator 36 is attached to a sidewall 38 of the lifting structure 12 and a second end of the actuator is attached to the lifting base/mounting/locking assembly 24. The actuator 36 may be a hydraulically or pneumatically actuated cylinder and piston arrangement, as is known, or electrically actuated, and may be attached to the lifting base/mounting/locking assembly 24 by a link 40.

Figure 4:
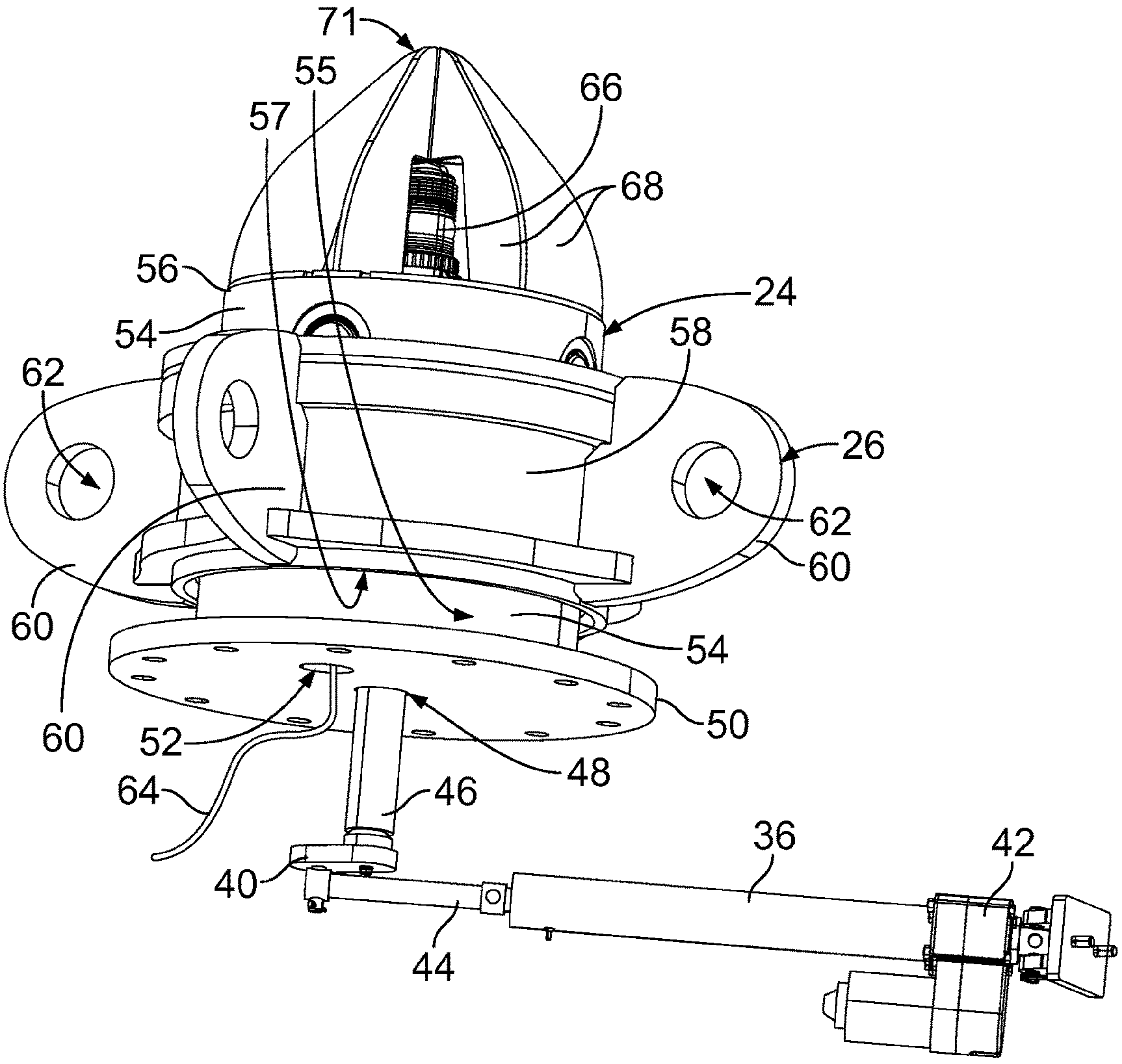
FIG. 4 is a perspective bottom view of a lift coupling system.
Figure 5:
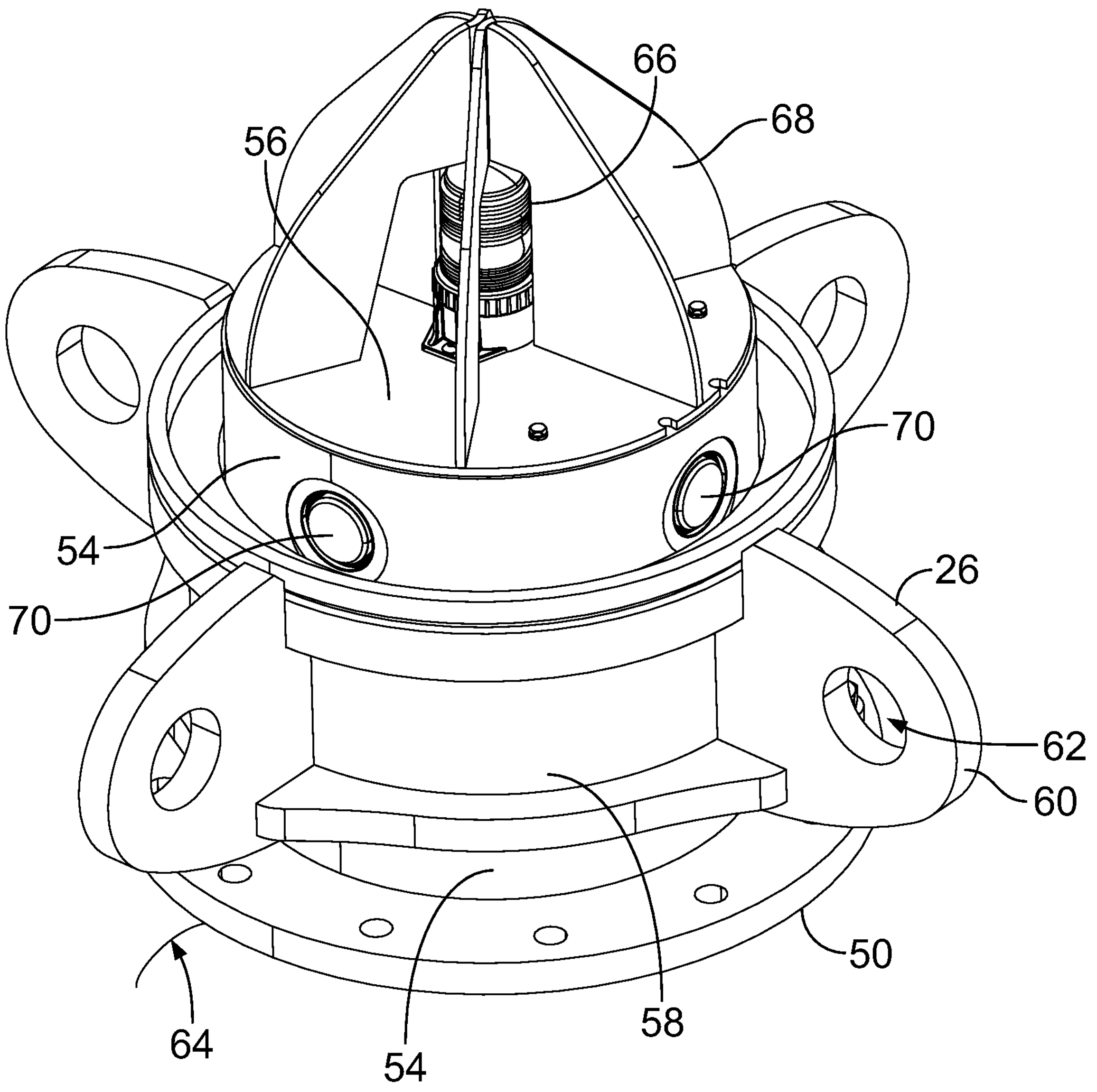
FIG. 5 is a perspective top view of a lift coupling system.

FIGS. 4 and 5 show the lift coupling system 22 without the lifting structure 12. The actuator 36 has a fixed end 42 and a movable end 44. The fixed end 42 is attachable to the lifting structure 12, for example (FIG. 3), and the movable end 44, which is extendable and retractable within the fixed end, is attached to the link 40. The link 40 is attached to a rod 46 that is configured to operate aspects of the lifting base as will be explained below via rotation thereof. The rod 46 passes through an opening 48 that may be formed through a base plate 50 of the lifting base/mounting/locking assembly 24. The base plate 50 may have an access port 52 to permit wiring or other connectivity from the communication module 32 (FIG. 3) or other sources of power and/or signal wiring 64, for example, to the interior of the lifting base/mounting/locking assembly 24. In alternative embodiments, the actuator may be any mechanism that is configured to operate aspects of the lifting base described hereinbelow.

A housing 54 extends upwardly (as seen in the figures) from the base plate 50 and forms an enclosure that contains a mechanism (FIGS. 8 and 9) that selectively causes engagement or disengagement of the housing from the lift collar 26. Correspondingly, the lift collar 26 has a body 58 that fits concentrically over the circular housing 54. While other shapes of the outer surface 55 of housing 54 and the inner surface 57 of body 58 are contemplated, configuring the outer and inner surfaces of the housing and the body, respectively, to have complimentary shapes enables the lift collar 26 to be lowered onto or lifted from the lifting base/mounting/locking assembly 24 regardless of orientation. The axial height of the lift collar 26 is less than the axial height of the housing 54 to permit the collar to drop below a plurality of lift pins 70, which are arranged about the periphery of the housing 54. When the lift pins 70 are extended radially outwardly from the housing 54 and the collar 26 is positioned below the lift pins, lifting the lift collar causes the collar to engage the lower surface of each of the lift pins, which couples the collar to the lift base/mounting/locking assembly 24 and permits the lift base, and the machine 1, to be lifted. The extension and retraction of the lift pins 70 from the housing 54 will be explained more fully hereinbelow.

The lift collar 26 has a plurality of vertical lift tabs 60 arranged about the exterior of the body 58. In an embodiment, there are four lift tabs 60 arranged equally about the circumference of the body 58. Each of the lift tabs 60 may have a tab opening 62 configured to receive and permit attachment of a lift hook or lift cable (not shown) of a crane or hoist (not shown). Other configurations of structural means of attaching the collar 26 to a hoisting mechanism, like a crane, are contemplated.

The housing 54 is closed on an end opposite the base plate 50 by a lid 56. The lid 56 forms a platform for other elements to be attached to the lifting base/mounting/locking assembly 24 and discourages foreign material from entering the interior of the lifting base.

Attached to the lid 56 is a guide element 68. The guide element 68 may be a cone-shaped or like structure with the narrow end oriented away from the lid 56 formed as a single piece construction. The guide element 68 may be two or more structures forming a narrow, pointed terminal end 71, with the structures broadening in the direction of the lid 56 with a transverse width at the lid about that of the housing 54. The guide element 68 therefore guides and centers the lift collar 26 onto the housing 54 when the lift collar is lowered by a crane or the like over the lifting base/mounting/locking assembly 24, which eases the coupling of the collar on the housing and reduces or avoids the need to manually direct the collar into position.

The guide element 68 protects a status indicator 66 located on the lid and is configured to permit an operator to determine the status of the lift coupling system 22 from a remote location. The status indicator 66 may be configured to provide a visual indication of the status, an auditory indication of the status, or a combination of both visual and auditory indications. The status indicator 66 extends upwardly from the lid 56 into the center of the guide element 68 and includes a light or visual indicator of the status of the lift coupling system 22. The status indicator 66 may produce a light, which may be intermittent or constant, that indicates that the lift coupling system 22 is in a state where lifting can safely commence. The light may be produced when the lift collar 26 is in position upon the lifting base/mounting/locking assembly 24 and the lifting base is fully engaged with the collar, as will be explained in detail hereinbelow. The status indicator 66 may produce a first sound when the lift coupling system 22 is in a state when lifting can safely commence and a second sound or no sound when the lift coupling system is not in a state when lifting can commence.

Figure 6:
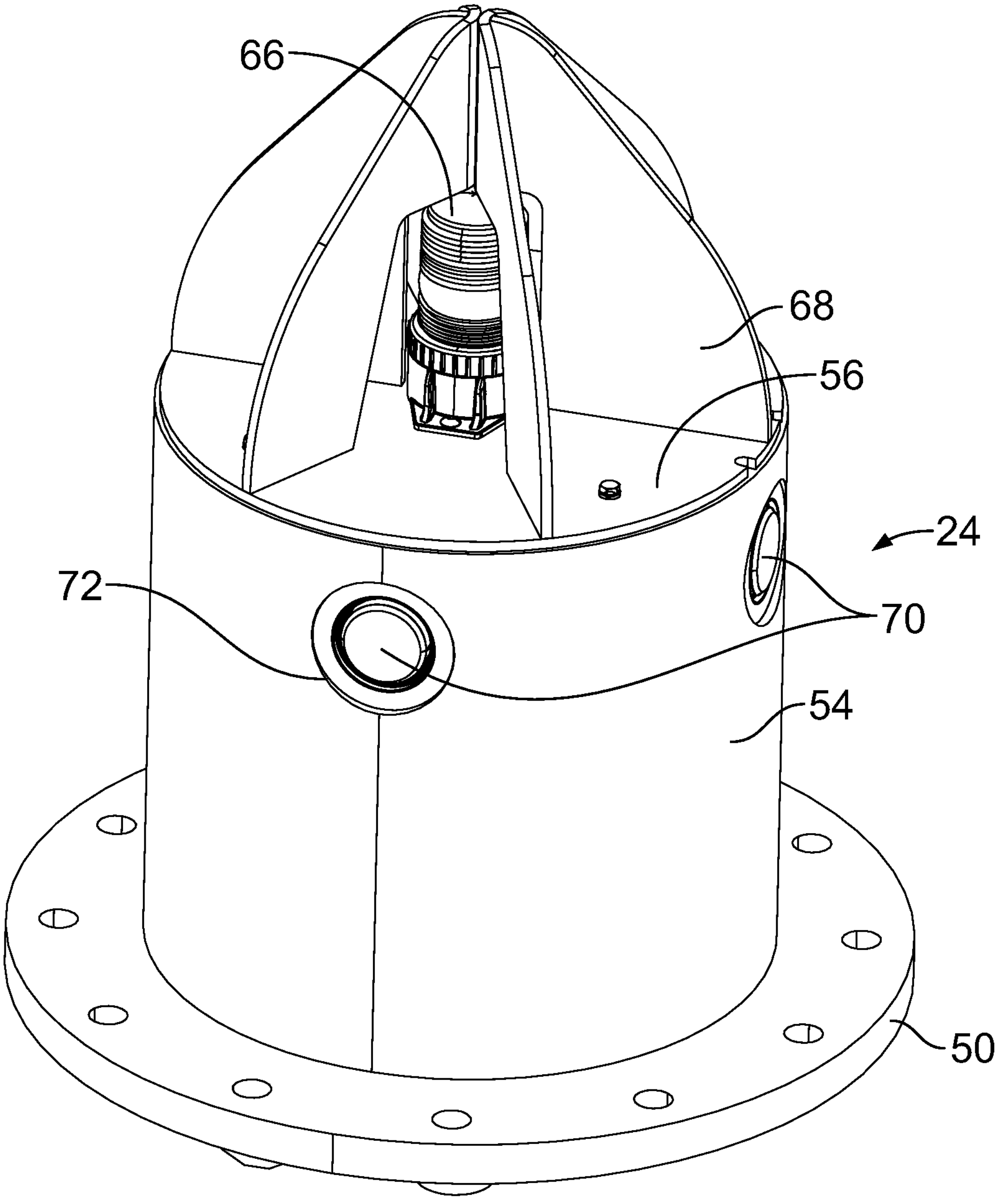
FIG. 6 is a lifting base of a lift coupling system without a lifting collar and retracted lift pins.
Figure 7:
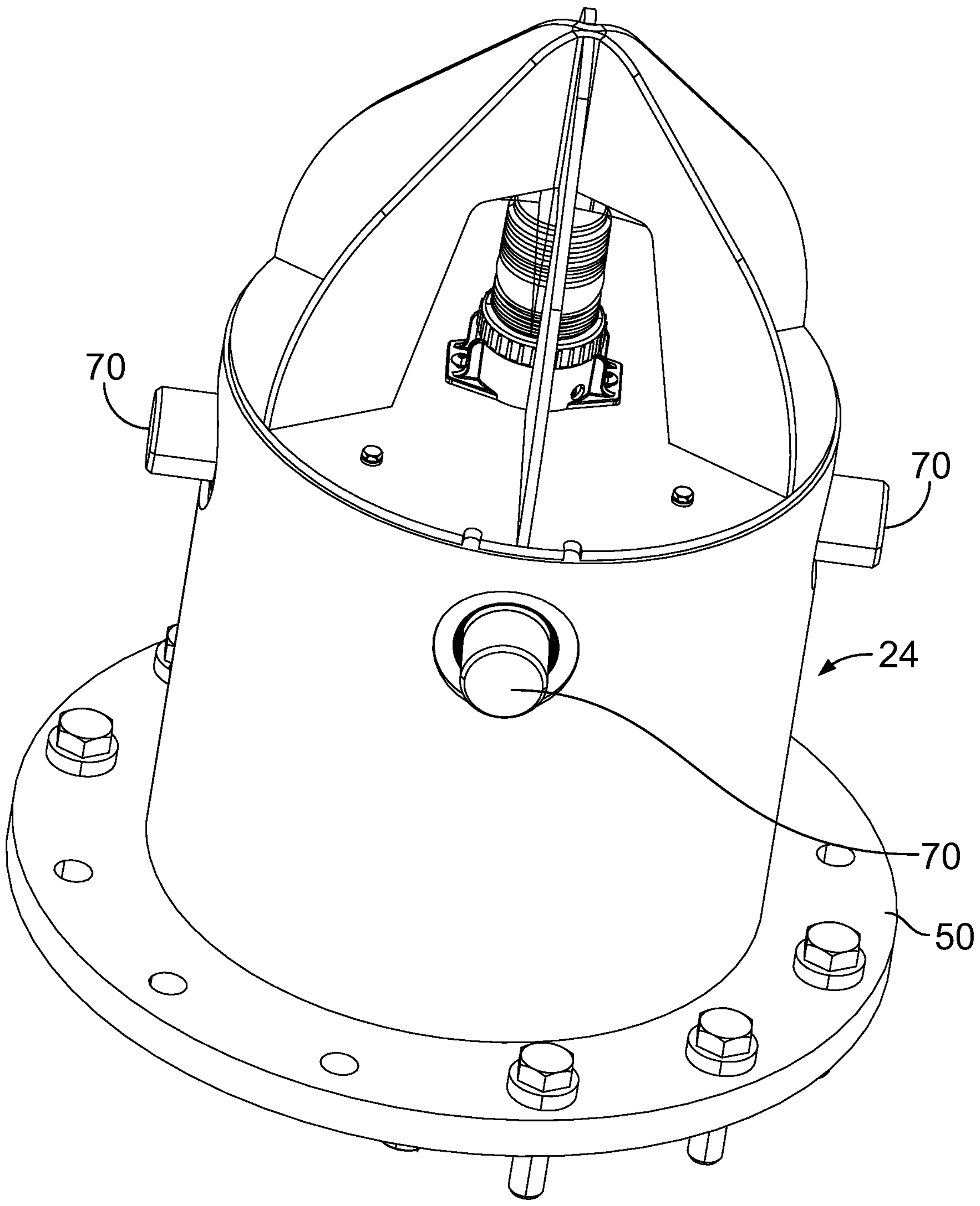
FIG. 7 is a lifting base of a lift coupling system without a lifting collar and extended lift pins.

FIG. 6 shows the lift base/mounting/locking assembly 24 with the lift collar 26 removed. The housing 54 is provided with a plurality of side openings 72 from which the lift pins 70 may be extended. When the lift pins 70 are retracted as shown there is no structure extending laterally or radially from the cylindrical shape of the housing 54. When the lift pins 70 are extended the lift pins form a plurality of cylindrical lateral or radial extensions from the housing that are shaped and sized to engage the collar 26 as will be explained in more detail herein. In an embodiment, the lift pins 70 are four cylindrical pins which are equidistantly spaced about the periphery of the housing. Other numbers and configurations of lift pins 70 are contemplated, such that there is sufficient structural strength to support the weight of the machine 1 through the lift coupling system 22. FIG. 7 shows the lifting base/mounting/locking assembly 24 with the lift pins 70 in an extended state.

Figure 8:
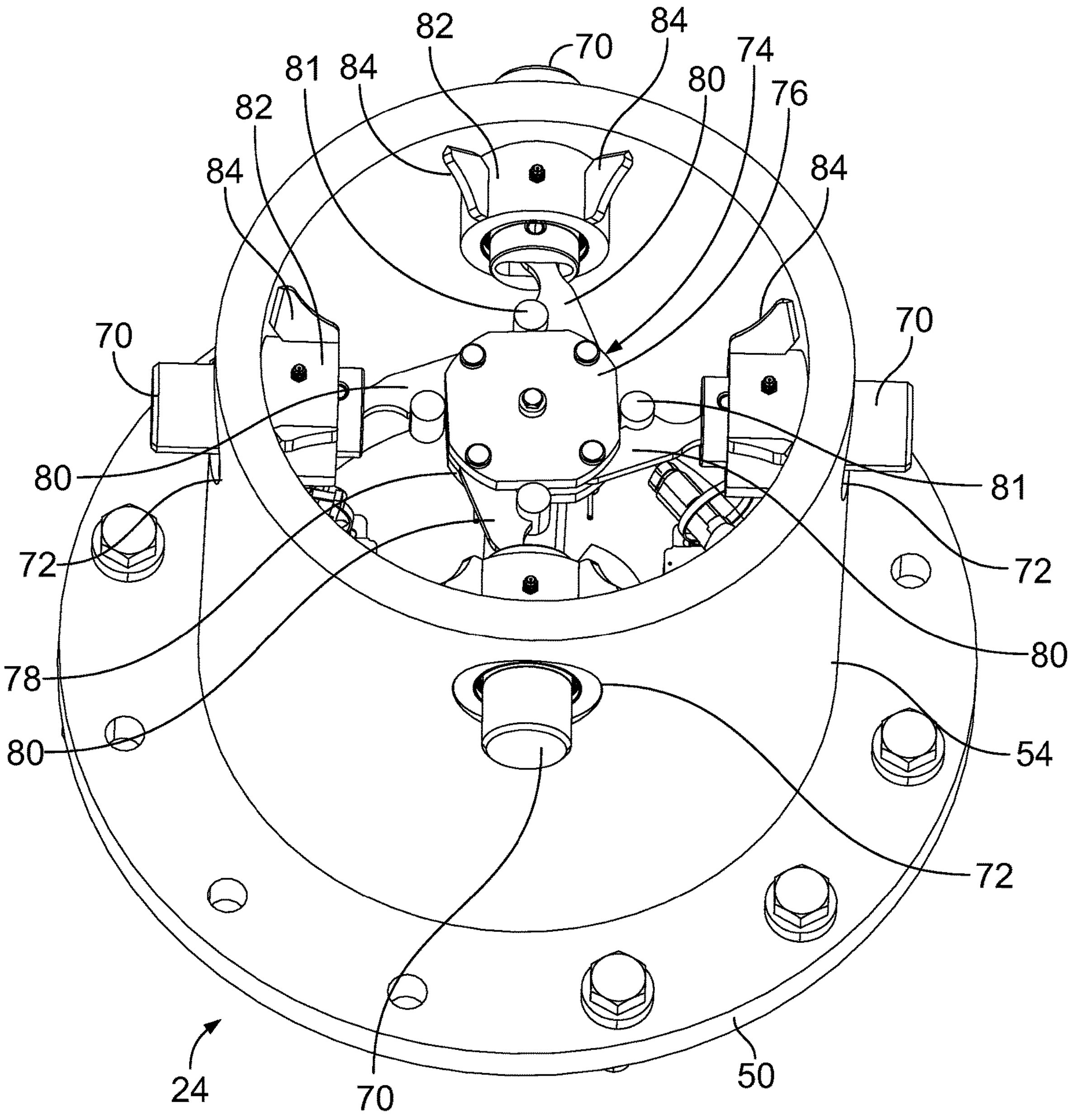
FIGS. 8 and 9 is a lifting base of a lift coupling system showing the interior thereof with the lift pins in an extended state.
Figure 9:
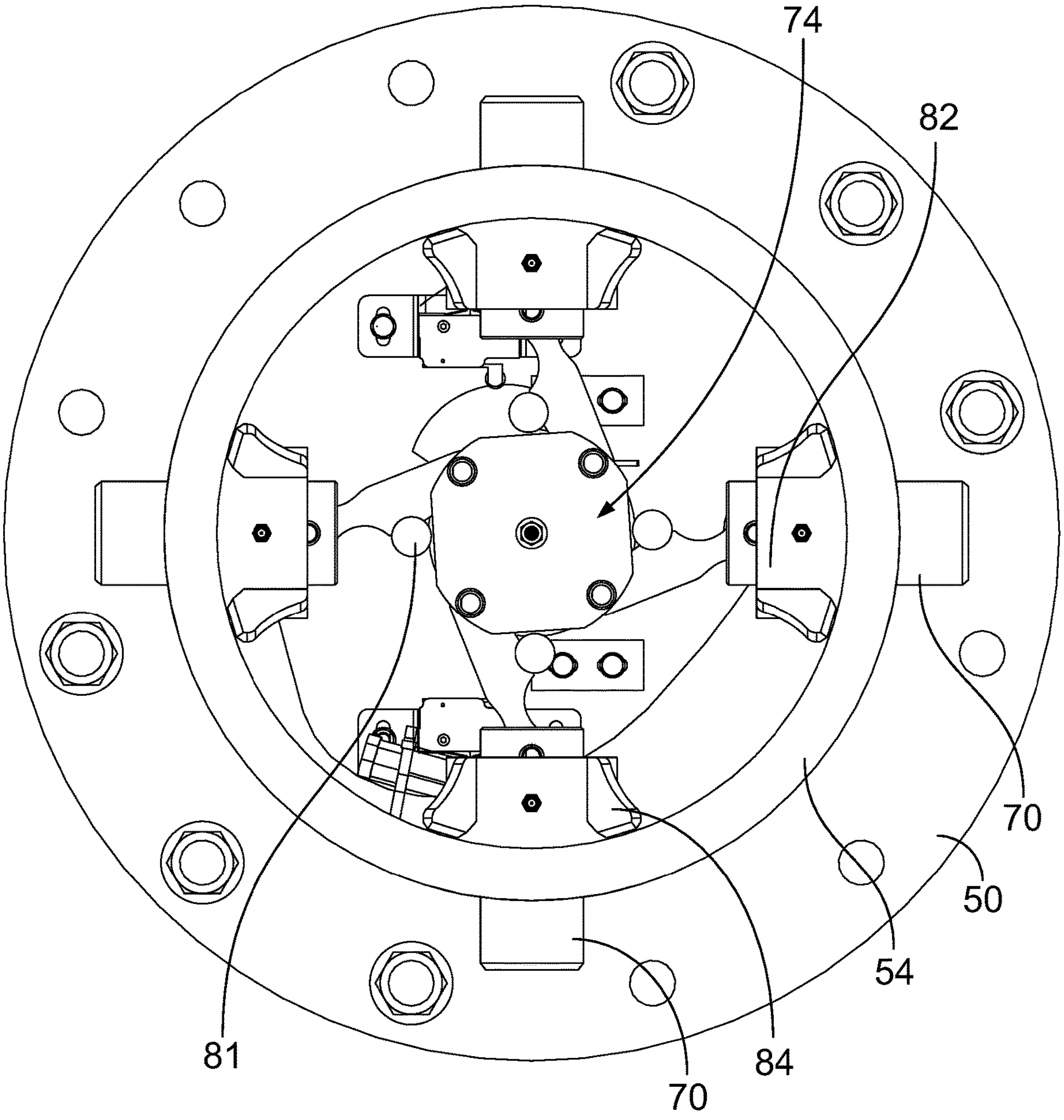
Figure 10A:
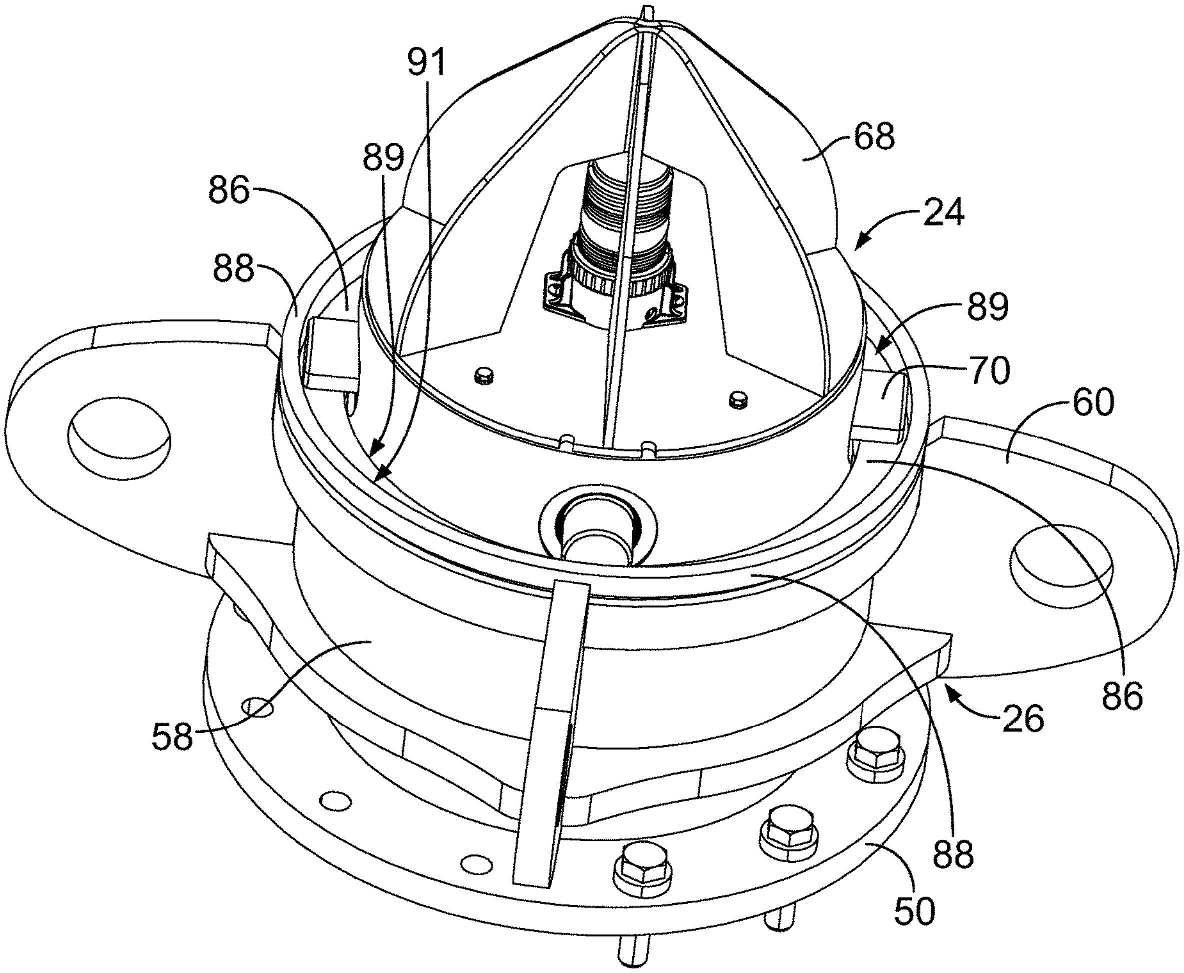
FIGS. 10*a* and 10*b* are a lifting base of a lift coupling system showing the exterior thereof.
Figure 10B:
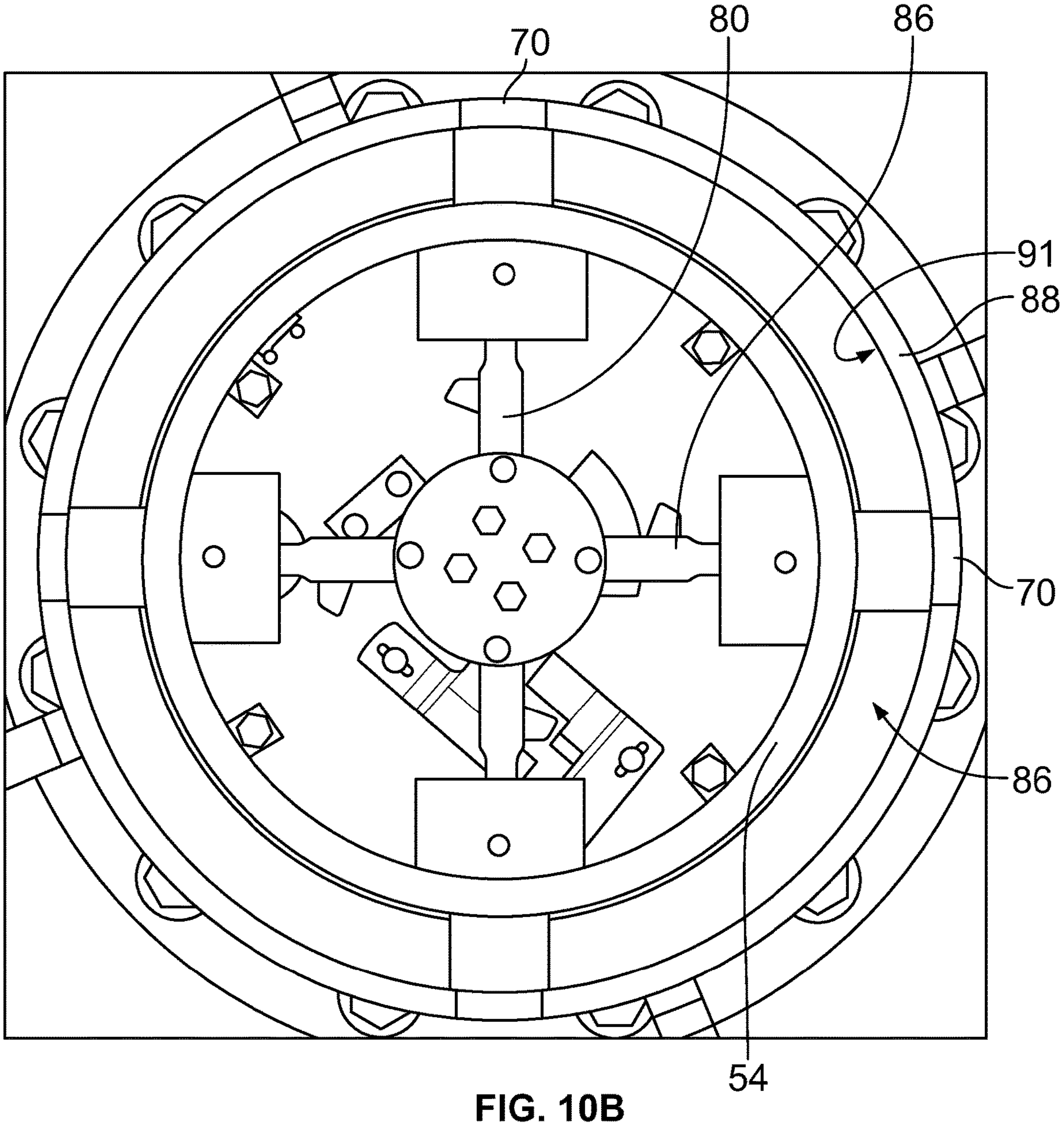
Figure 11:
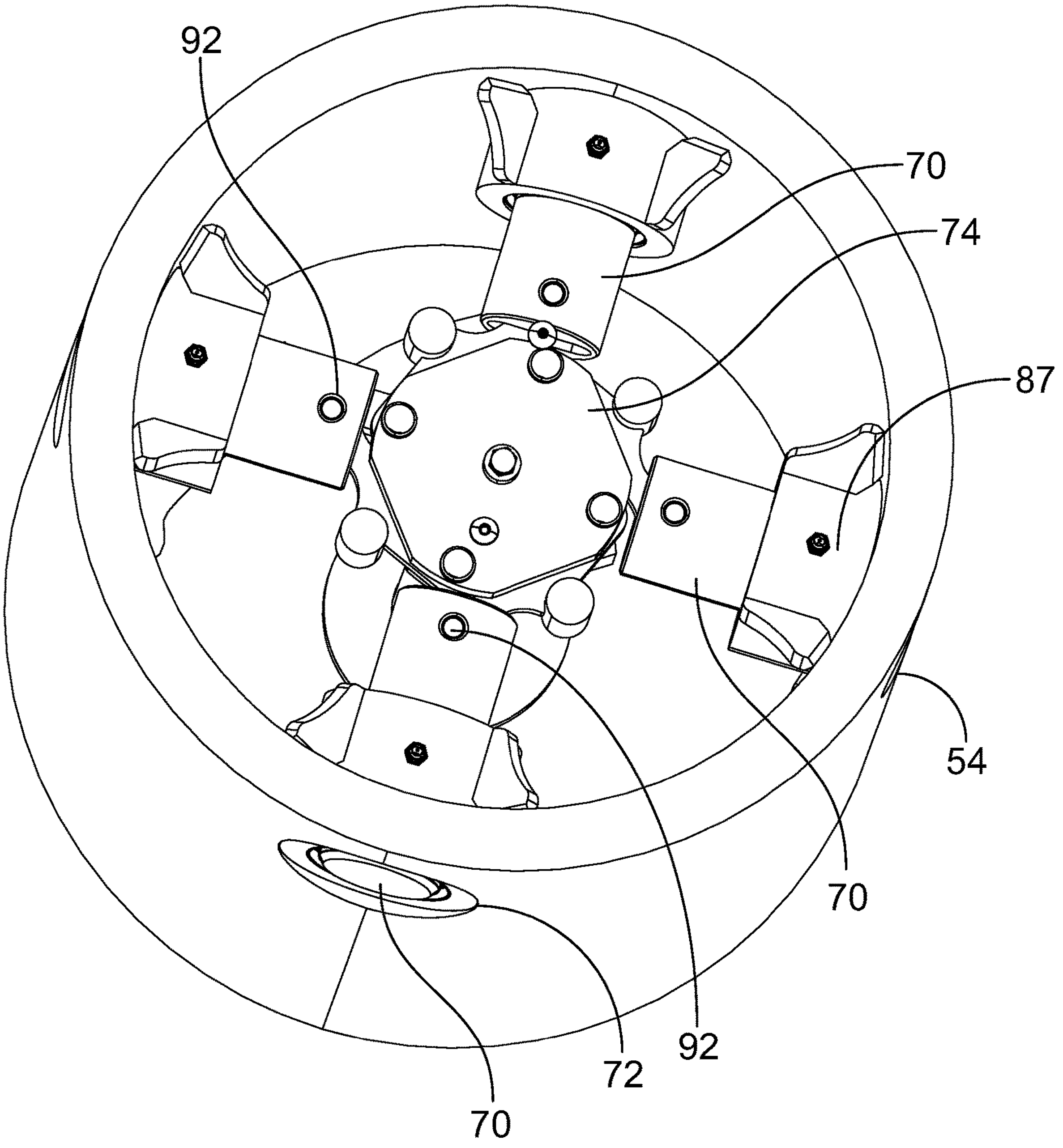
FIG. 11 is a lifting base of a lift coupling system showing the interior thereof with the housing and other elements removed.

FIGS. 8-11 show states of the lifting base/mounting/locking assembly 24 of FIG. 7 with the lid 56 removed such that the interior of the housing 54 is visible to show aspects of the mechanism that moves the pins 70 into and out of the housing to generate an engageable state as shown in FIGS. 8, 9, and 10*a*, an intermediate state as shown in FIG. 10*b* and a disengageable state as shown in FIG. 11. It will be understood that in the engageable state, the pins 70 are configured to extend outwardly from the housing 54 and are positioned to engage the collar 26. In the disengageable state the pins are retracted within the housing 54 so as to permit the collar to be lowered upon or removed from the lifting base. Specifically, FIGS. 8 and 9 show the arrangement of elements to produce an extended state of the lift pins 70 whereby engagement of the lift pins and collar lift collar 26 can positively occur as shown in FIG. 10*a*. The state shown in FIG. 11 shows the arrangement of elements to produce the retracted state of the lift pins 70 whereby engagement of the lift pins and collar 26 is prevented and whereby the collar can be guided onto or off of the lift base/mounting/locking assembly 24.

In one embodiment, the lift collar 26 includes an annular lift ring 86 positioned at an upper end of the body 58 to form a horizontal engagement surface radially outside of the inner diameter of the lift collar 26 that the lift pins 70 engage when the collar is being lifted as the lift pins are extended as shown in FIG. 10*a*. Extending upward from the outer edge of the lift ring 86 is an annular safety ring that has an inner diameter greater than the inner diameter of the lift collar 26. The difference in diameter between the inner diameter of the lift collar 26 and the safety ring 88 (i.e., the radial width of the lift ring 86 forms a pin channel 89 into which the lift pins 70 are positioned when in the extended state and the lift collar 26 is being lifted. The size and shape (e.g., the position of the inner surface 91 of the safety ring 88) of the channel 89 prohibits the pins 70 from extending further than in the extended state. In order for the pins 70 to retract, they must be extended from the housing 54 to the fully extended intermediate position, which is prevented by the inner annular surface 91 of the safety ring 88 when the pins are located in the channel 89. This feature prevents the pins 70 from being retracted and thus prevents movement of the pins from the engaged state to the retraced state and inadvertent disengagement of the collar 26 from the lift base/mounting/locking assembly 24 during lifting, i.e., when the collar 26 is engaged with the lifting base/mounting/locking assembly 24. In other words, since the pins 70 must move from the extended state to the fully extended intermediate state before being retracted, the inner annular surface 91 of the safety ring 88 prevents the disengagement of the lift collar 26 during a lifting operation. For the lift collar 26 to be lifted over and off of the lifting base/mounting/locking assembly 24, the collar must first be lowered relative to the lifting base such that the pins 70 are no longer positioned in the channel 89, whereupon the pins can be retracted, moving first to the fully extended intermediate position from the extended position or state and then to the retracted position or state.

To illustrate the intermediate state, FIG. 10*b* shows the pins 70 extended a maximum distance, which is a greater distance than in the extended state (see FIG. 10*a*) resulting when each link 80 and the lift pin 70 to which it is attached are axially aligned. This alignment creates the greatest possible extension of the lift pins 70 from the housing 54. As can be seen in FIG. 10*b*, the pins 70, when fully extended, reach outward from the housing 54 past the channel 86 and past the inner surface 91 and safety ring 88. When the pins 70 are fully extended, the pins cannot be received in the channel 86 and cannot engage the lift ring 86.

The extension of the pins 70 in FIG. 10*a*, creates the extended state with the collar 26 positioned underneath and arranged about the housing 54 and engaged with the pins. Starting at the extended state, the pins, in order to be moved to a retracted state, must pass through the fully extended intermediate state shown in FIG. 10*b*. When the pins 70 are positioned in the channel 86, the pins cannot extend past the safety ring 88, and cannot be moved to a retracted state to permit disengagement of the collar 26 from the housing 54.

Referring to at least FIGS. 8 and 9, the mechanism of the lifting base/mounting/locking assembly 24 for translating the pins 70 inwardly and outwardly relative to the lifting base includes a link flange 74 mounted to the rod 46 (FIG. 4) so as to rotate therewith in response to movement of the actuator 36. The link flange 74 may include a pair of plates, including a top plate 76 and a bottom plate 78 positioned below, spaced apart from, and parallel to the top plate. The link flange 74 may have a plurality of pin links 80 positioned and pinned between the top and bottom plates 76, 78. The pin links 80 are provided in a number equal to the number of pins 70. Each pin link 80 is pivotally attached to the link flange 74 at one end thereof and is pivotally attached to a corresponding one of the pins 70 at an opposite end thereof. Each pin link 80 may include a link stop feature 81 that is configured to contact the link flange 74 in the event that the link flange 74 is rotated farther than a configuration that produces the extended state of the pins 70.

The pins 70 are each positioned within a corresponding sleeve 82 which are attached to the housing 54 at the side openings 72. The sleeves 82 are each configured to receive one of the lift pins 70 such that each lift pin can slidingly reciprocate within its sleeve. Each of the sleeves 82 may be braced with a plurality of struts 84 positioned around each of the sleeves and attached to the sleeve and housing 54.

FIG. 11 shows part of the lift base/mounting/locking assembly 24 with the pins 70 in a retracted state. In this configuration, the link flange 74 is rotated counterclockwise relative to the position as shown in FIG. 9, for example. In FIG. 11 the wrist pins 92 that connect the links 80 to the pins 70 can be seen with the pins retracted into the interior of the housing 54. The pins 70, in the retracted state to not extend past the outer wall of the housing 54 to permit the collar 26 (not shown) to be lowered onto or lifted from around the lift base/mounting/locking assembly 24.

Figure 12:
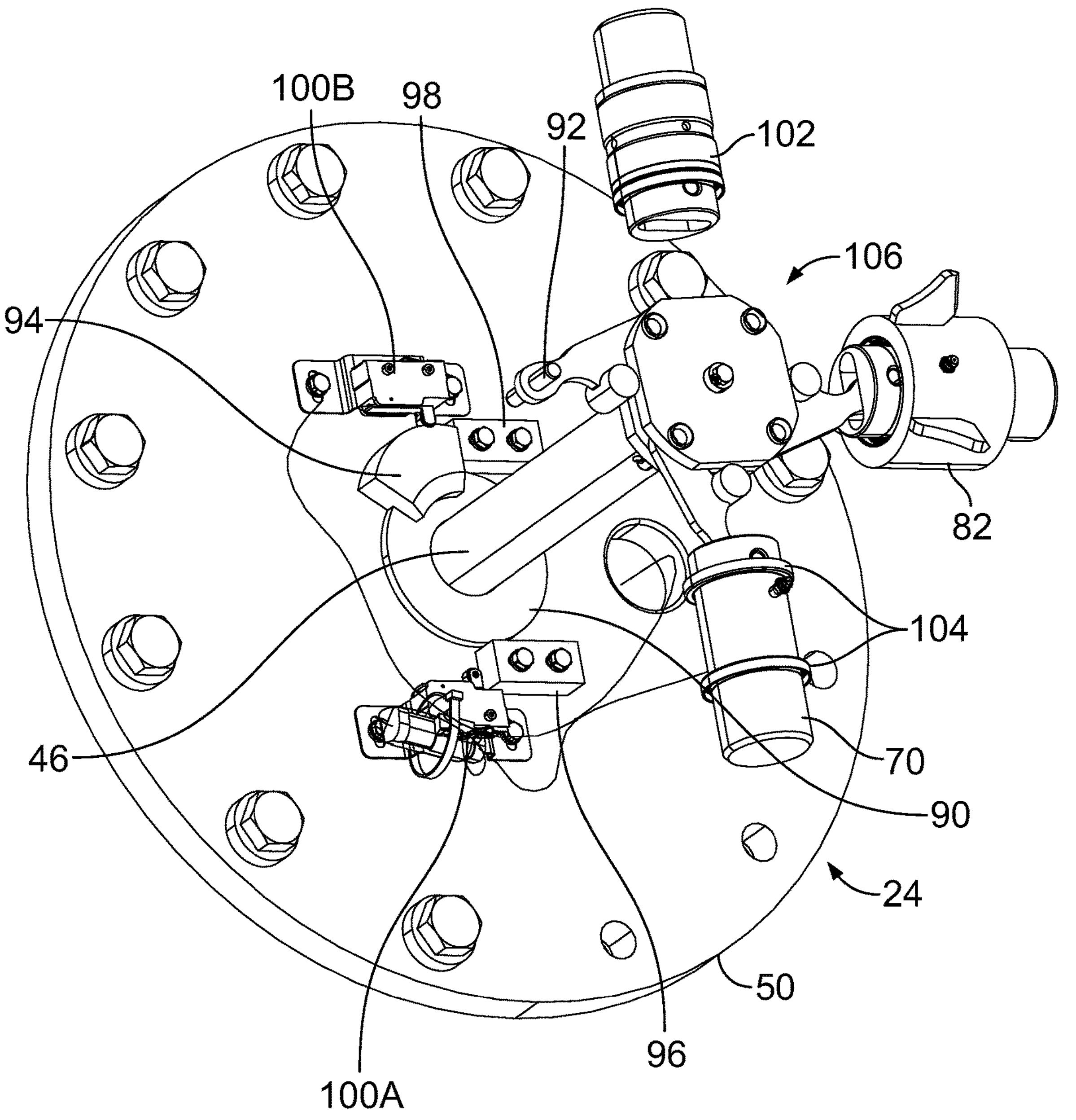
FIG. 12 is a lifting base of a lift coupling system showing the interior thereof with the housing and additional other elements removed.

FIG. 12 shows part of the pin translation mechanism 106 that translates the pins 70 in and out of the lift base/mounting/locking assembly 24 with the housing removed for clarity. The rod 46 includes a stop flange 90 formed around the rod and positioned adjacent and above the base plate 50. The stop flange 90 may be fixed to the rod 46 to prevent the rod from moving downwardly through the opening 48 (FIG. 4) formed through the base plate 50. The stop flange 90 includes a stop block 94 attached to and extending from a periphery of the stop flange. Attached to the base plate 50 are two stops, a first stop 96 that is positioned to contact the stop block 94 when the rod 46 is rotated fully counterclockwise to produce the retracted state. A second stop 98 is positioned to contact the stop block 94 when the rod 46 is rotated fully clockwise to produce the extended state. The first and second stops 96, 98 each have a respective sensor 100A, 100B, which may be in the form of a switch, for example, to detect when the stop block 94 is in a rotational position to produce one of the states. The sensors 100A, 100B may be in communication with the status indicator 66 and may be configured, when triggered by the stop block 94 to permit a signal or power to be transmitted to the status indicator, which responsively produces a signal, for example a light with a color corresponding to the extended state or the retracted state dependent upon which sensor has been triggered. The pin translation mechanism 106 may, in a simple form, be considered to include the actuator 36, which rotates the rod 46 to move the link flange 74, which is attached to links 80, which when the mechanism is activated functions to translate the pins 70.

It should be noted that for clarity in FIG. 12, the sleeve 82 has been removed from some of the lift pins 70 to better show some of the internal features of each pin and sleeve construction. Each sleeve 82 may have a cylinder liner 102 press fit or otherwise positioned within a sleeve. The liner 102 may be made of a material that permits movement within without binding or sticking. Each lift pin 70 may include a pair of spaced rings 104, which function as grease seals, that are sized and shaped to fit within a cylinder liner 102 and are configured to remain static with respect to the cylinder liner. The pins 70 reciprocate with the cylinder liner 102 and the rings 104. The cylinder 102 and rings 104 are made of a material that permits sliding engagement and also transfer of loads from the pins 70 during lifting of the machine 1.

Figure 15:
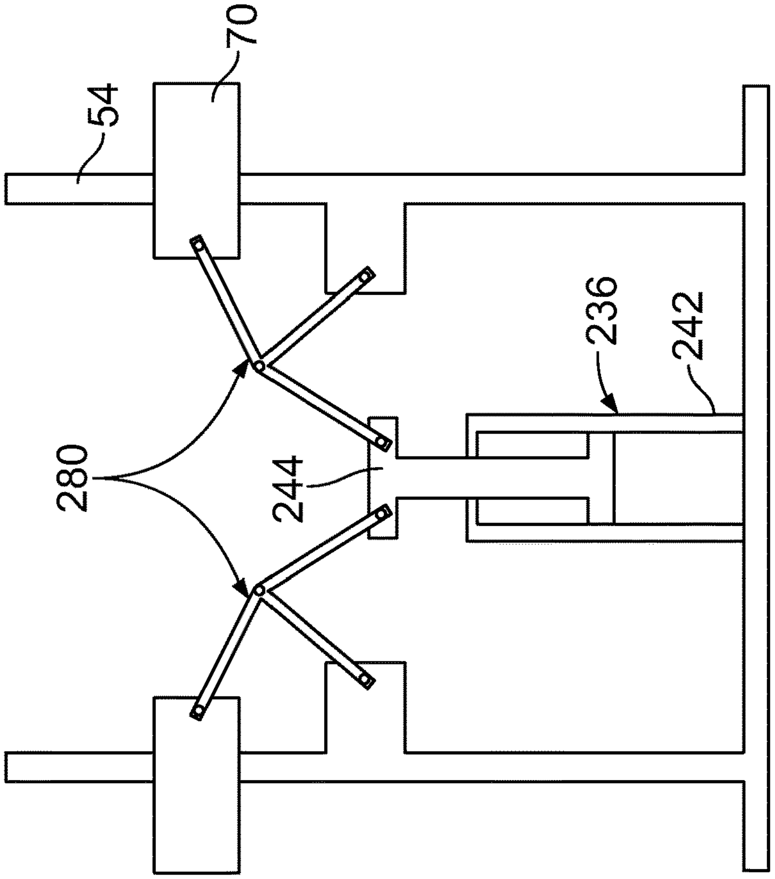
FIGS. 14-19 are alternative mechanisms for moving lift pins of the lift coupling system.
Figure 14:
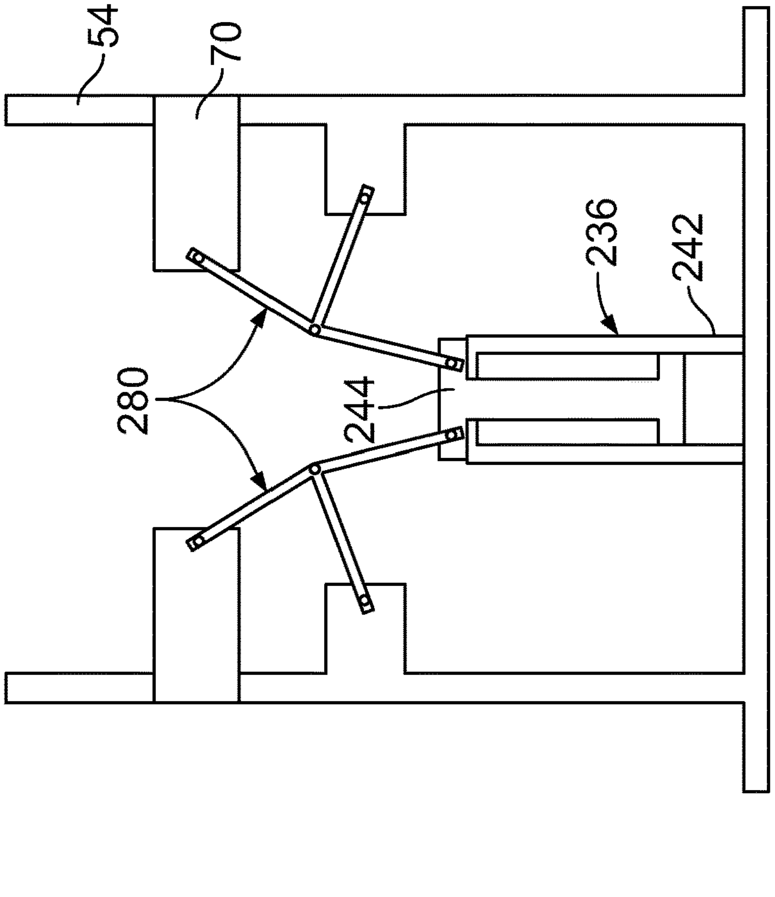

FIGS. 14 and 15 show a plurality of alternative actuators 236. The actuators 236 each include a fixed part 242, which may be in the form of a fluid cylinder, and a movable part 244 that is configured to move inwardly and outwardly relative to the fixed part. The movable part 244 may be in the form of a piston/pin. A linkage 280 is attached to each movable part 244 and a pin 70. The linkage 280 is also attached to a fixed point 299 on the housing 54. The part of the linkage 280 that is fixed to the housing 54 forms a fulcrum and enables each linkage to move an attached one of the pins 70 outwardly and inwardly relative to the housing when the movable part 244 is caused to move in and out of the fixed part 242. FIG. 14 shows the pins 70 in a retracted state and FIG. 15 shows the pins 70 in an extended state.

Figure 17:
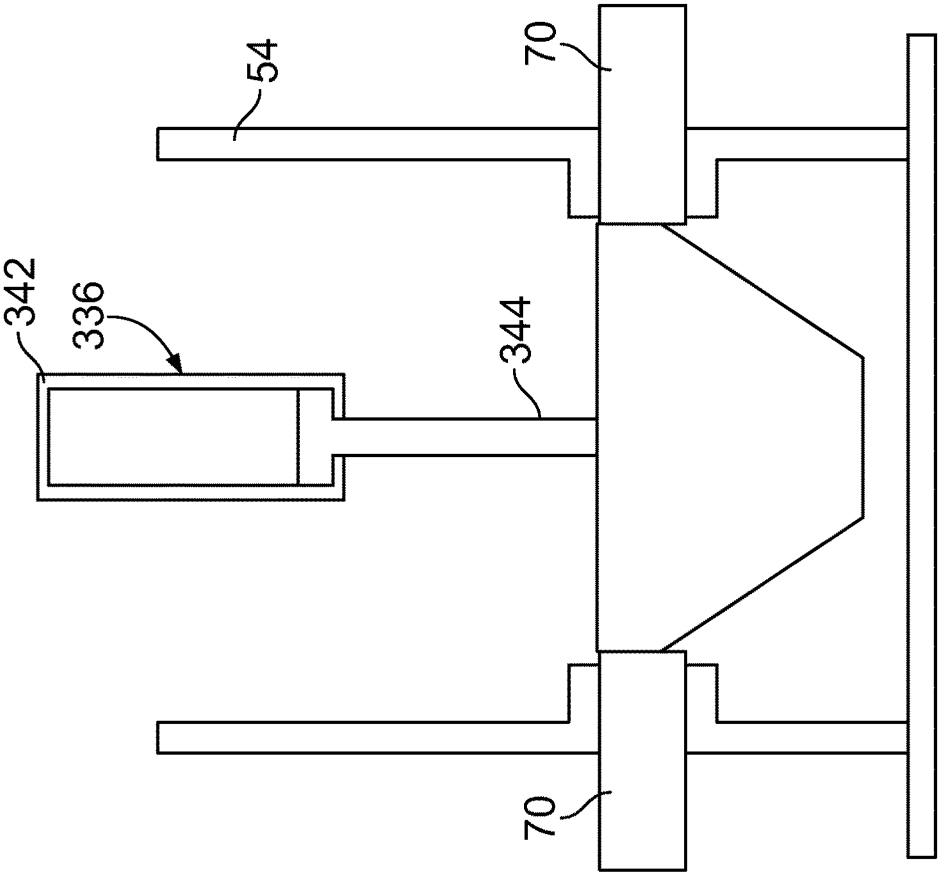
Figure 16:
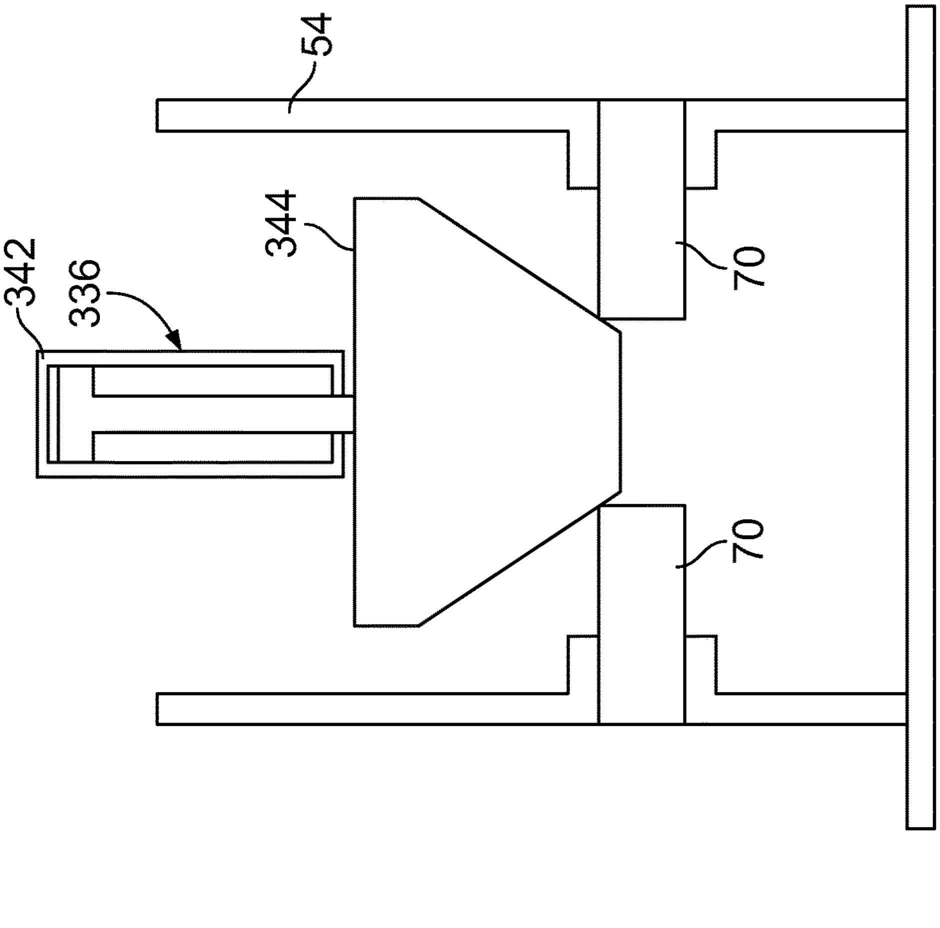

FIGS. 16 and 17 show an alternative actuator 336. The actuator 336 includes a fixed part 342, which may be in the form of a fluid cylinder, and a movable part 344 that is configured to move inwardly and outwardly relative to the fixed part. The movable part 344 may be in the form of a cone-shaped wedge. The movable part 344 is positioned and configured so as to move the pins 70 outwardly and inwardly relative to the housing when the movable part 344 is caused to move in and out of the fixed part 342. FIG. 16 shows the pins 70 in a retracted state and FIG. 17 shows the pins 70 in an extended state.

Figure 18:
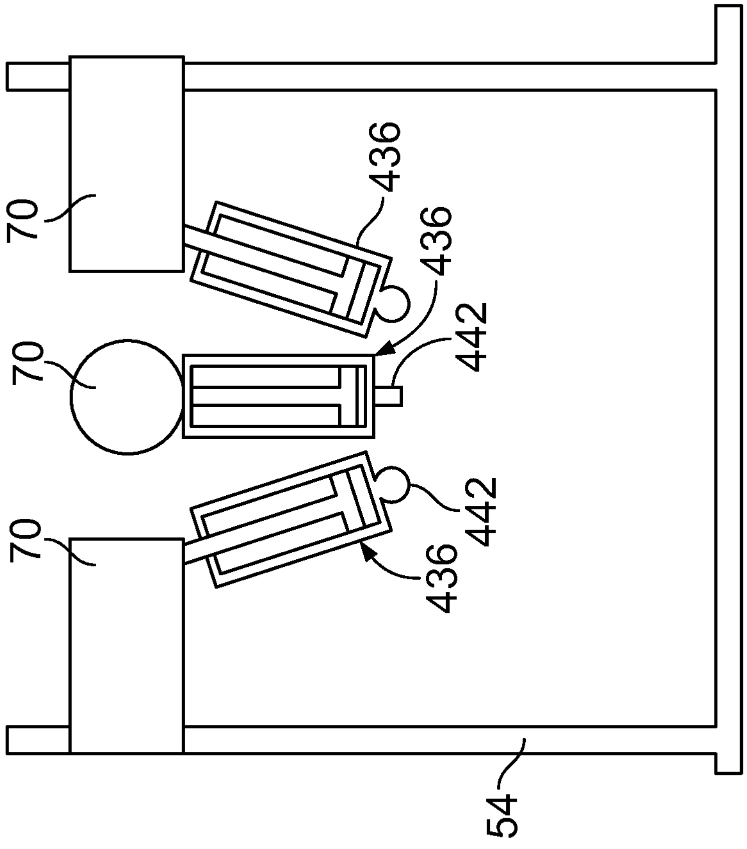
Figure 19:
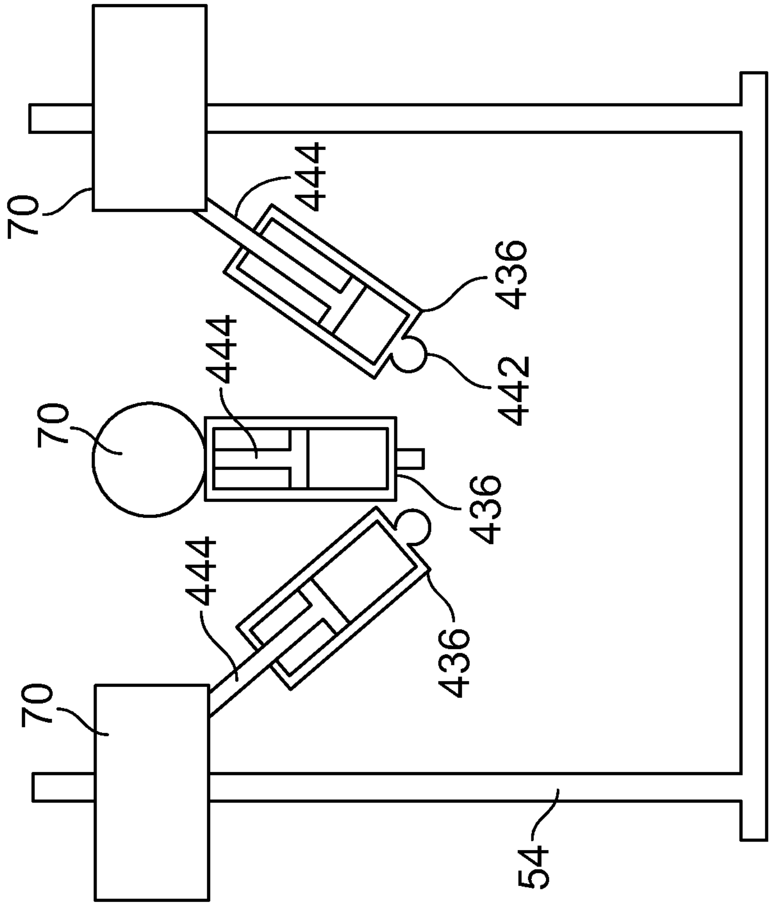

FIGS. 18 and 19 show a plurality of alternative actuators 436. The actuators 436 each include a fixed part 442, which may be in the form of a fluid cylinder, and a movable part 444 that is configured to move inwardly and outwardly relative to the fixed part. The movable part 444 may be in the form of a piston/pin. Each movable part 444 is attached to one of the pins 70. Each movable part 444 is configured to move an attached pin 70 outwardly and inwardly relative to the housing when the movable part 444 is caused to move in and out of the fixed part 442. FIG. 18 shows the pins 70 in a retracted state and FIG. 19 shows the pins 70 in an extended state.

INDUSTRIAL APPLICABILITY

The industrial applicability of the system described herein will be readily appreciated from the forgoing discussion. The foregoing discussion is applicable to machines that are lifted into a work site.

Figure 13:
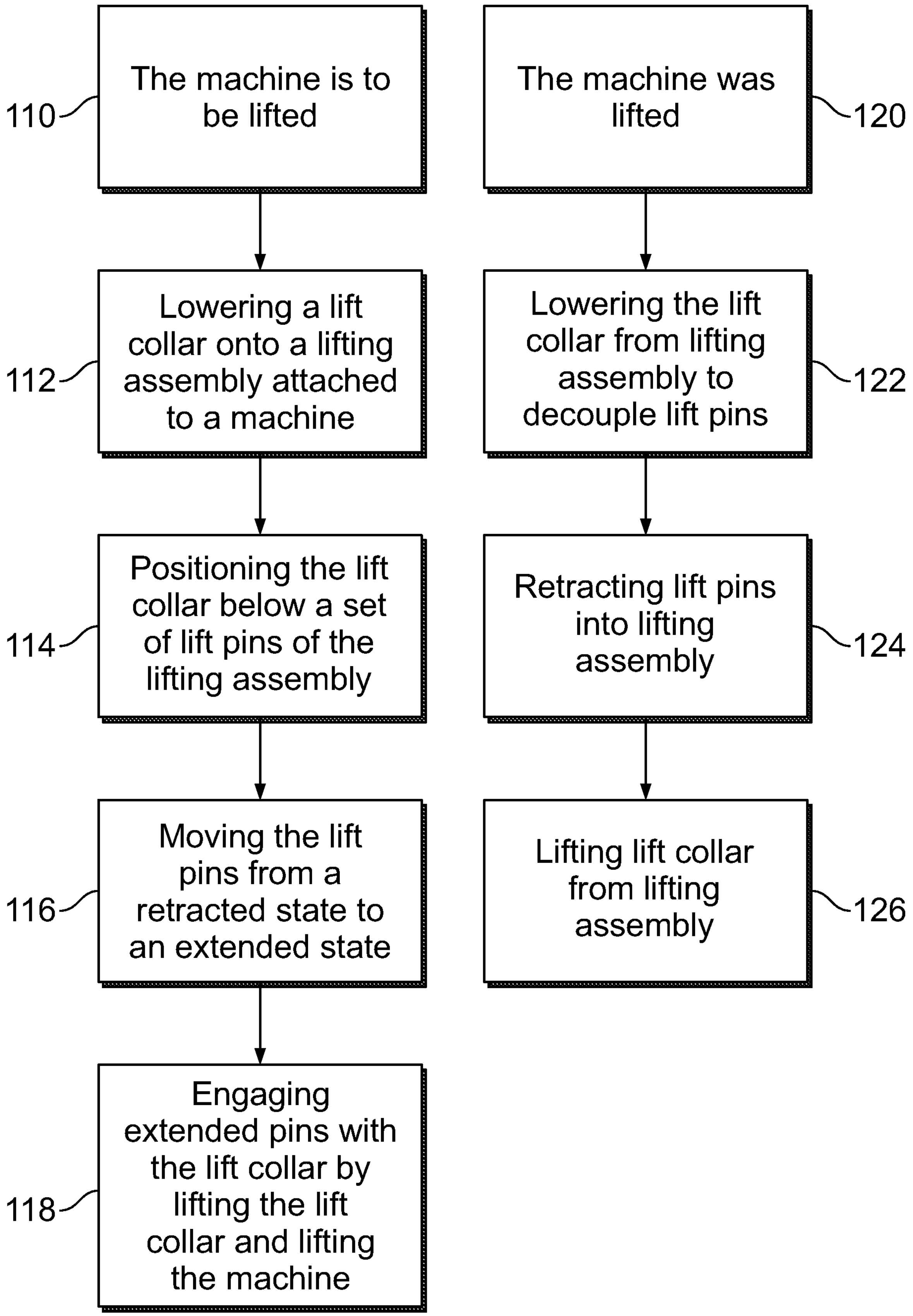
FIG. 13 is a flowchart of a method of operating a lift coupling system according to an embodiment of the disclosure.

One example of industrial applicability according to the disclosure, in operation, illustrates a method of lifting a machine as shown in FIG. 13. Also referring to the other figures, the method includes positioning a machine 1 near a crane, hoist or the like near a work site accessible to the crane (step 110). With a lifting base/mounting/locking assembly 24 preinstalled on the machine 1, a lift collar 26 portion of a lift coupling system 22 is attached to cable(s) of the crane. The lift collar 26 is positioned over and lowered onto the lifting base/mounting/locking assembly 24 guided by guide elements of the lifting base/mounting/locking assembly 24 (step 112). A status indicator 66 configured to permit remote monitoring of the state of the lifting base/mounting/locking assembly 24, i.e., may generate a visual signal indicative of the retracted status when the lifting base has the lift pins 70 in a retracted position within the housing 54 of the lifting base. The retracted status indication alerts operators that the lifting base/mounting/locking assembly 24 is prepared to receive the collar 26. For example, the status indicator 66 may generate a red light to indicate that the lifting base/mounting/locking assembly 24 is in a state reflecting that pins are retracted, and lifting cannot safely commence, and conversely when in a state of engagement, the status indicator may generate a flashing green light. Other indicators, including different color combinations, are contemplated.

When an operator observes that the collar 26 is properly positioned around the housing 54 of the lifting base/mounting/locking assembly 24 (see step 112) and is positioned such that the channel 89 is below the lift pins 70 (step 114), the operator, by engaging the remote control 56, may wirelessly activate the actuator 36 via an input, which actuator extends and rotates the rod 46. Rotation of the rod 46 rotates the link flange 74 in a clockwise direction as shown in FIG. 11, which extends the links 80 and thus the pins 70 (step 116). The pins 70 are first extended fully (see FIG. 10*b*) when the links 80 are axially aligned with the axis of the pins and, as the link flange 74 continues to rotate, the pins are then retracted less than the full amount possible into the extended position, in which position they are outside the housing 54 and positioned to fit within the channel 89 of the lift collar 26. The stop block 94 triggers the sensor 100B which sends a signal to the communication module 32, which causes the indicator 66 to indicate a change of status. The signal indicating that the rod 46 has reached the specified limit of rotation to produce the engaged state, may also cause the actuator 36 to stop operating. In addition, the communication module 32 may send an additional signal wirelessly to the operator via the remote 56 that indicates that the lift coupling system 22 is in a condition to lift the collar 26 into engagement with the lift pins 70 of the lifting base/mounting/locking assembly 24. When the collar 26 is lifted, the lift pins 70 engage the surface of the lift ring 86 and the safety ring 88 prohibits the pins from retracting because the pins would have to move into the fully extended state before retracting, and the diameter of the safety ring 88 is less than the diameter that the pins would assume in the fully extended state. The machine 1 may then be lifted by hoisting the collar (step 118).

While the lift coupling system is in the engaged state with lift pins 70 extended, the collar 26 in place, and the crane fully burdened by the weight of the machine, there is a normal force applied by the collar 26 to the pins 70 which combines with material roughness to form the resistive force of friction, which has the effect of preventing the pins from easily slipping back and forth across the collar on the lift ring 86. The actuator 36, which is configured to extend/retract the pins 70, is configured with many times lower force than the force that which would be necessary to generate the force required to overcome this generated amount of friction. Accordingly, the pins 70 cannot be inadvertently retracted while the machine is being lifted. In one embodiment, movement of the pins 70 relative to the collar 26 is prevented when a weight of about 1000 kg is lifted via the lift coupling system.

The handheld remote is paired with the radio receiver mounted to the machine to give distant operators remote control of the extending/retracting of the lift pins on the device. The remote itself may have protection against accidental activation in the form of a button sequence, and/or simultaneous button press, and/or timed press/hold of button(s), and against actuating in conflict with other nearby frequencies.

Once the collar 26 has been couple to the lifting base/mounting/locking assembly 24 and the machine 1 has been lifted and moved to the work site, the steps above can be performed in reverse order to decouple the collar (steps 120-126). Once decoupled, the collar 26 may be lifted out of the work site so as to prevent interference with operation of the machine 1.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A lift coupling system for enabling an object to be lifted, comprising:
- a lifting base, configured to be attached to the object, comprising:
  - a housing,
  - a plurality of lift pins configured to move between a retracted state, within the housing, and an extended state, wherein a portion of each of the plurality of lift pins are extended outwardly from the housing,
  - a rod rotatably disposed in the housing,
  - a plurality of pin links pivotally attached to the rod, wherein each pin link, of the plurality of pin links, is pivotally attached to a respective one of the plurality of lift pins, and
  - an actuator configured to rotate the rod to move the plurality of lift pins between the retracted state and the extended state; and
- a lift collar, comprising:
  - a lift collar body, shaped and sized to fit about the housing, configured to;
    - contact the plurality of lift pins when the lift collar is positioned about the housing and when the plurality of lift pins are extended outwardly to the extended state to couple the lift collar to the lifting base, and
    - decouple from the lifting base when the plurality of lift pins are retracted into the housing to the retracted state.

2. The lift coupling system of claim 1, wherein an outer surface of the housing and an inner surface of the lift collar body are both circular.

3. The lift coupling system of claim 1, wherein the plurality of lift pins comprises four, spaced-apart lift pins.

4. The lift coupling system of claim 1, wherein the actuator is a linear actuator that is pneumatically, hydraulically, or electrically actuated.

5. The lift coupling system of claim 1, wherein the lift collar further comprises a plurality of spaced-apart lift tabs, arranged on the lift collar body, configured to enable lifting of the lifting base and the object thereby when the lift collar is coupled to the lifting base.

6. The lift coupling system of claim 1, further comprising:
- a remote control configured to receive manual inputs and responsively generate control signals; and
- a communication module configured to receive the control signals and responsively send commands to the actuator to move the plurality of lift pins between the retracted state and the extended state.

7. The lift coupling system of claim 6, wherein the commands include one or both of signals or power.

8. The lift coupling system of claim 6, further comprising:
- a rod flange arranged about the rod;
- a stop block attached to the rod flange;
- a first sensor positioned to contact the stop block when the plurality of lift pins are in the extended state; and
- a second sensor positioned to contact the stop block when the plurality of lift pins are in the retracted state.

9. The lift coupling system of claim 8, wherein at least one of:
- the first sensor, when contacted by the stop block, is configured to transmit a signal to the communication module indicative of the extended state, whereupon the communication module is configured to cause the actuator to stop the lift coupling system in the extended state, or
- the second sensor, when contacted by the stop block, is configured to transmit a signal to the communication module indicative of the retracted state, whereupon the communication module is configured to cause the actuator to stop the lift coupling system in the retracted state.

10. The lift coupling system of claim 1, wherein the actuator is configured to move the plurality of lift pins to a fully extended state, wherein, when in the fully extended state, the plurality of lift pins are extended to a distance greater than when in the extended state.

11. The lift coupling system of claim 10, wherein the lift collar includes a safety ring configured to receive the plurality of lift pins therewithin when in the extended state, wherein the safety ring is sized to block movement of the plurality of lift pins from the extended state through the fully extended state and to the retracted state when the lift collar is coupled to the lifting base.

12. The lift coupling system of claim 1, further comprising
- a plurality of sleeves attached to the housing, wherein the plurality of sleeves each defines a side opening through the housing, and wherein each of the plurality of sleeves is configured to slidingly receive one of the plurality of lift pins.

13. A system for enabling an object to be lifted, comprising:
an object;
a single point lifting structure attached to the object;
a lift coupling system, comprising:
a lifting base, attached to the single point lifting structure, comprising:
a housing,
a plurality of lift pins that are configured to move between a retracted state within the housing, and an extended state wherein a portion of each of the plurality of lift pins are extended outwardly from the housing, and
an actuator configured to move the plurality of lift pins between the retracted state and the extended state; and
a lift collar, comprising:
a lift collar body, shaped and sized to fit about the housing, configured to:
contact the plurality of lift pins when the lift collar is positioned about the housing and when the lift pins are in the extended state to couple the lift collar to the lifting base, and
decouple from the lifting base when the lift pins are in the retracted state, and
a plurality of spaced-apart lift tabs, arranged on the lift collar body, configured to enable lifting of the lifting base and the object thereby when the lift collar is coupled to the lifting base.

14. The system of claim 13, wherein the lift coupling system further comprises:
a rod rotatably disposed in the housing, and
a plurality of pin links pivotally attached to the rod,
wherein each pin link, of the plurality of pin links, is pivotally attached to a respective one of the plurality of lift pins, and wherein the actuator is configured to rotate the rod to move the plurality of lift pins between the retracted state and the extended state.

15. The system of claim 14 wherein the actuator is a linear actuator that is pneumatically, hydraulically, or electrically actuated.

16. A method of operating a lift coupling system, comprising:
lowering a lift collar onto a lifting base,
wherein the lifting base comprises a housing, and
wherein the lifting base is attached to an object;
positioning the lift collar below a plurality of lift pins of the lifting base;
rotating, via an actuator, a rod within the housing to move the plurality of lift pins from a retracted state, within the housing, to an extended state in which the plurality of lift pins are extended from the lifting base,
wherein a portion of each of the plurality of lift pins are extended outwardly from the housing,
wherein the rod is pivotally attached to a plurality of pin links, wherein each pin link, of the plurality of pin links, is pivotally attached to a respective one of the plurality of lift pins; and
engaging the lift collar with the plurality of lift pins to lift the object.

17. The method of claim 16, wherein the actuator is configured to be controlled remotely.

18. The method of claim 16, wherein the lift collar engages with the plurality of pins at a bottom surface of the plurality of lift pins to lift the object.

19. The method of claim 16, further comprising:
generating, based on received manually inputs, control signals for lowering the lift collar.

20. The method of claim 16, wherein the lift collar includes a safety ring configured to receive the plurality of lift pins therewithin when in the extended state.

* * * * *